April 7, 1964     F. W. PLEUGER     3,127,865
PROPULSION UNITS FOR WATERCRAFT

Filed Dec. 12, 1961     2 Sheets-Sheet 1

INVENTOR
FRIEDRICH WILHELM PLEUGER

BY
Richards & Geier
ATTORNEYS

April 7, 1964  F. W. PLEUGER  3,127,865
PROPULSION UNITS FOR WATERCRAFT
Filed Dec. 12, 1961  2 Sheets-Sheet 2

INVENTOR:
FRIEDRICH WILHELM PLEUGER
BY
Richards & Geier
ATTORNEYS

United States Patent Office 3,127,865
Patented Apr. 7, 1964

3,127,865
PROPULSION UNITS FOR WATERCRAFT
Friedrich Wilhelm Pleuger, Juthornstrasse 80,
Hamburg-Wandsbek, Germany
Filed Dec. 12, 1961, Ser. No. 158,771
Claims priority, application Germany Dec. 23, 1960
1 Claim. (Cl. 114—148)

This invention relates to propulsion units for watercraft and more especially to those having two propellers arranged in a duct.

For the propulsion of watercraft, so-called bow-jet rudders are known, in which two propellers are arranged in tandem in a transverse duct of the hull of the vessel, being driven in the same or opposite directions by a vertical shaft coupled to an engine and by way of a bevel gearing disposed between said propellers. By means of this rigid power transmission, both propellers run at the same number of revolutions. However, this does not conform to the actually prevailing hydraulic conditions, because the aspirating propeller must run more slowly than the propeller receiving the flow in order to obtain a best possible power output.

This object is achieved according to the invention by the fact that the two propellers arranged in tandem in the transverse duct are coupled by means of a differential gear to one another and to the driving shaft. The differential gear used in accordance with the invention for coupling the two propellers to the driving shaft produces, in a manner similar to that obtained for example in motor vehicles, an automatic adjustment of the running speeds of the two propellers to the actual operational conditions.

The differential gear can drive the two propellers in the same or opposite directions. Depending on whether the intake is from port or starboard, one or other of the propellers always runs more slowly or more quickly so that their speeds are automatically and positively adapted to the actually prevailing hydraulic conditions, and also balance the different loads of the propellers with different flow conditions. In this way, the power transmission is given a high efficiency.

Two embodiments of the invention are shown by way of example in the drawing, wherein.

Figure 1:
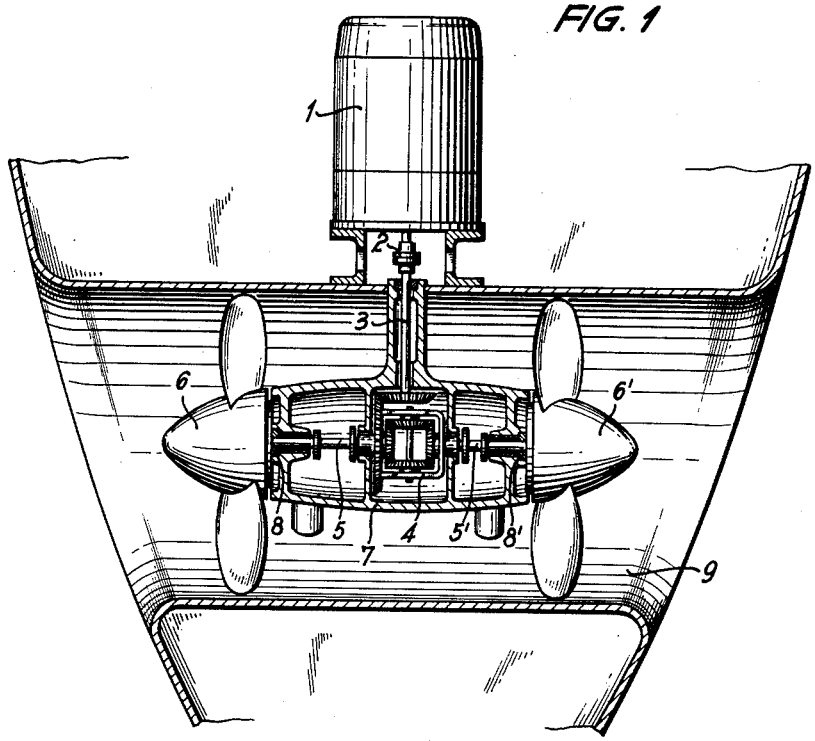
FIGURE 1 is a cross section of the propulsion unit with a differential gear for driving both propellers in the same direction.

According to FIGURE 1, a propulsion engine 1, for example an electric motor or internal combustion engine, is coupled by way of a clutch 2 to a vertical shaft 3, which drives the horizontal shafts 5, 5' of the propellers 6, 6' in the same direction of rotation by way of a differential gear 4. The differential gear 4 is arranged in a housing 7, which also contains the bearings of the propeller shafts 5, 5' and is sealed at its outlet points in liquid-tight manner by packings 8, 8'. The housing 7 can be filled with oil and be under a constant slight superatmospheric pressure from above so as to compensate for any leakage losses.

The two propellers 6, 6' are arranged in tandem in a horizontal transverse duct 9 provided at the bow of the vessel.

The motor 1, drives the two propellers 6, 6' through the shaft 3, and the differential gear 4 in the same direction, the speeds of said propellers being adjusted to the actually prevailing hydraulic conditions.

Figure 2:
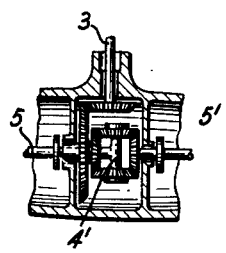
FIGURE 2 is a partial section of the propulsion unit with an oppositely driving differential gear.

Instead of the differential gear 4, it is possible to provide according to FIGURE 2, a differential gear 4' which drives the two propellers 5, 5' in opposite directions where the propellers are of opposite hand.

Figure 3:
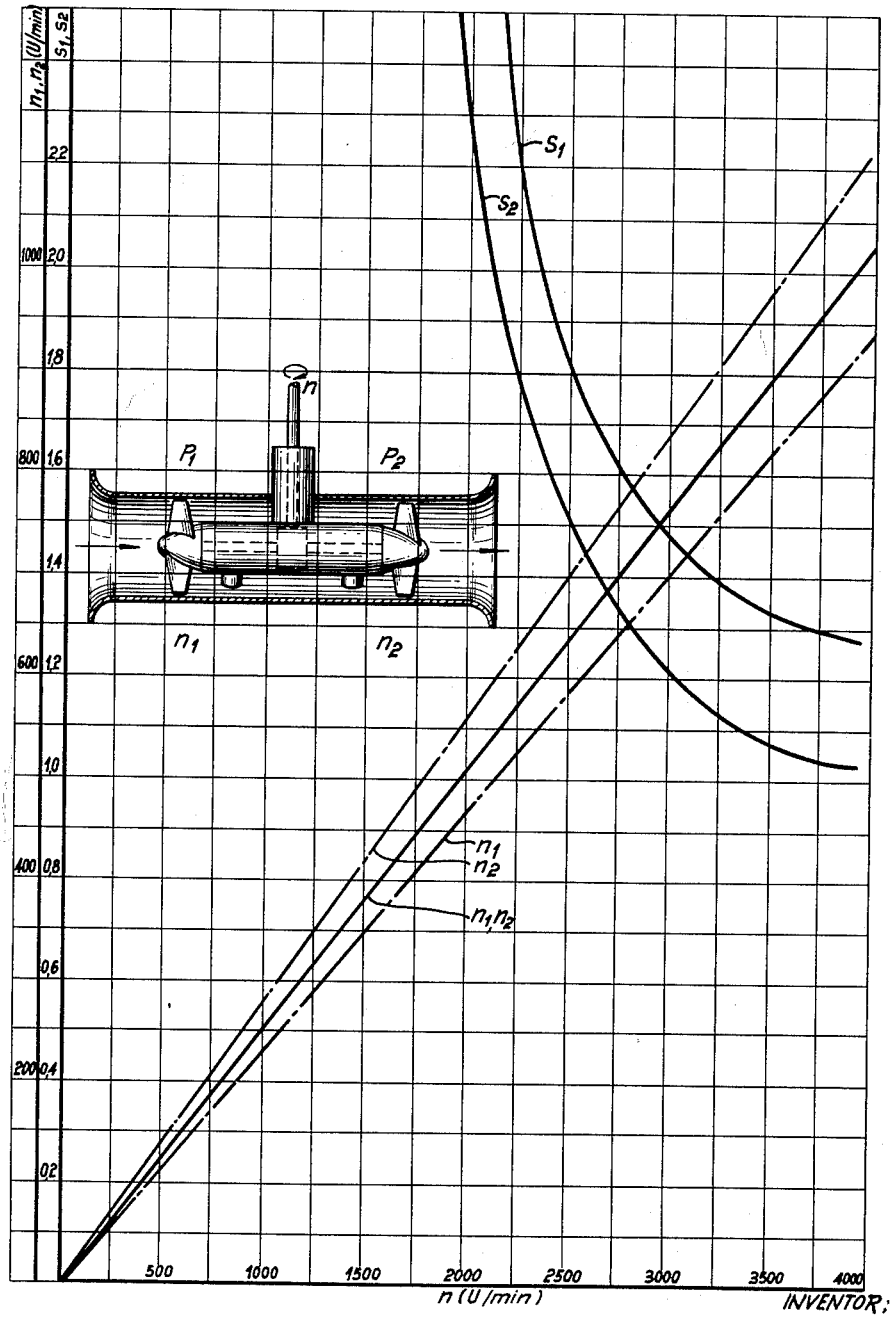
FIGURE 3 is a graph with different characteristic lines relating to the speed of rotation.

If for example the starboard propeller 6 draws in the water and the port propeller 6' is acted upon by the flow of the first propeller 6, the conditions represented in the graph of FIGURE 3 are produced.

The speeds $n_1$, $n_2$ of the two propellers $p_1$, $p_2$ and also their specific thrust $s_1$, $s_2$ are plotted in in this graph over the speed of the engine 1. As will be seen from the straight speed characteristics, a considerable difference exists between the speed $n_1$ of the aspirating propeller $p_1$ and the speed $n_2$ of the propeller $p_2$ receiving the flow. For comparison purposes, the speed being produced with a blocked differential gear 4 or 4' is plotted by the solid centre line, and by comparison with this speed, the speed $n_1$ of the aspirating propeller $p_1$ is lower, whereas the propeller $p_2$ acted upon by the flow has a higher speed $n_2$.

The specific thrust $s_1$ with the differential gear engaged has substantially higher values than the specific thrust $s_2$ which is produced with a blocked differential gear.

These characteristic curves which have been obtained by practical experiments and measurements show that the incorporation of a differential gear in the driving means of the two propellers, as proposed according to the invention, substantially improves the specific thrust and thus also the efficiency of the installation. By driving the propellers in opposite directions, in accordance with FIGURE 2, a further improvement in the efficiency can be obtained.

The invention is not limited to the specific fields of application as described hereabove, it being understood that certain changes may be made in the invention and different embodiments may be made without departing from the scope thereof, and that all matter contained in the above described disclosure is intended to be interpreted as illustrative and not in a limiting sense.

I claim:

In a watercraft having a bow with a horizontal transverse duct, a propulsion unit comprising a driving motor carried by the watercraft and having a vertical motor shaft, a clutch carried by a lower end of said shaft, a vertical driving shaft having an upper end connected with said clutch and extending into said duct, a tubular casing located in said duct and connected with the watercraft, said casing liquid-tightly enclosing the last-mentioned shaft, an aspirating propeller in said duct, a flow-receiving propeller in said duct, a horizontal shaft firmly connected with said aspirating propeller, a horizontal shaft firmly connected with said flow receiving propeller, a horizontal housing liquid-tightly connected with said casing and having bearings liquid-tightly supporting the two last-mentioned shafts, whereby said two propellers are arranged in tandem in said duct, said housing being adapted to be filled with oil under superatmospheric pressure, and differential gear means located in said housing and comprising a horizontal gear firmly connected with the lower end of the vertical driving shaft, a larger vertical gear firmly connected with the shaft of the aspirating propeller and meshing with said horizontal gear, a smaller vertical gear firmly connected with the shaft of the aspirating propeller, another smaller vertical gear firmly connected with the shaft of the flow-receiving propeller, and two horizontal gears meshing with the two smaller vertical gears, whereby said differential gear means drive said aspirating propeller at a slower speed than that of said flow-receiving propeller and in the same direction as that of said flow-receiving propeller and whereby said differential gear means automatically adjust the relative speeds of the two propellers.

References Cited in the file of this patent

UNITED STATES PATENTS

| | | |
|---|---|---|
| 122,301 | Wildman | Dec. 26, 1871 |
| 598,424 | Kuss | Feb. 1, 1898 |
| 873,818 | Wilke | Dec. 17, 1907 |
| 1,090,322 | McLaughlin | Mar. 17, 1914 |
| 1,972,780 | Laskowitz | Sept. 4, 1934 |
| 2,655,891 | Gorski | Oct. 20, 1953 |
| 3,008,443 | Blickle | Nov. 14, 1961 |

FOREIGN PATENTS

| | | |
|---|---|---|
| 579,780 | Great Britain | Aug. 15, 1946 |
| 697,285 | Great Britain | Sept. 16, 1953 |